United States Patent
Baughman et al.

(10) Patent No.: US 11,452,940 B2
(45) Date of Patent: Sep. 27, 2022

(54) REAL-WORLD ACTIVITY SIMULATION AUGMENTATION WITH REAL-WORLD DATA OF THE ACTIVITY

(71) Applicant: International Business Machines Corporation, Armonk, NY (US)

(72) Inventors: Aaron K. Baughman, Cary, NC (US); Shikhar Kwatra, Raleigh, NC (US); Mary Rudden, Denver, CO (US); Gray Franklin Cannon, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/896,825

(22) Filed: Jun. 9, 2020

(65) Prior Publication Data
US 2021/0379492 A1 Dec. 9, 2021

(51) Int. Cl.
*A63F 13/65* (2014.01)
*A63F 13/23* (2014.01)
*G06T 19/00* (2011.01)
*A63F 13/52* (2014.01)

(52) U.S. Cl.
CPC .............. *A63F 13/65* (2014.09); *A63F 13/23* (2014.09); *A63F 13/52* (2014.09); *G06T 19/006* (2013.01); *A63F 2300/69* (2013.01); *A63F 2300/8082* (2013.01)

(58) Field of Classification Search
CPC ..................................................... A63F 13/65
See application file for complete search history.

(56) References Cited

U.S. PATENT DOCUMENTS

| 8,287,383 | B1 | 10/2012 | Etter et al. | |
| 8,668,561 | B2 | 3/2014 | Hansen et al. | |
| 9,242,177 | B2 | 1/2016 | Bistis et al. | |
| 9,839,809 | B2* | 12/2017 | Wohl | H04B 1/719 |
| 10,143,925 | B2* | 12/2018 | Middleton | A63F 13/217 |
| 10,478,730 | B1* | 11/2019 | Burnett | A63F 13/828 |

(Continued)

FOREIGN PATENT DOCUMENTS

| CN | 102755745 A | 10/2012 |
| CN | 104536763 A | 4/2015 |

(Continued)

OTHER PUBLICATIONS

Duffley, "Big 12: Anti-Texas 'Horns Down' Gesture Now Worthy of a Penalty", FanBuzz, Jul. 16, 2019, https://fanbuzz.com/college-football/big-12/horns-down-penalty/.

(Continued)

*Primary Examiner* — Jay Trent Liddle
(74) *Attorney, Agent, or Firm* — Garg Law Firm, PLLC; Rakesh Garg; Michael O'Keefe

(57) ABSTRACT

By analyzing video, audio, and statistical data of a real-world activity, a real-world scenario is identified that is within a threshold similarity of the analyzed video, audio, and statistical data of the real-world activity. The real-world scenario is applied to a game application that uses the real-world activity as a data source, the applying comprising adjusting a portion of a physics engine, the physics engine simulating a physical phenomenon portrayed in the game application.

20 Claims, 13 Drawing Sheets

(56) References Cited

U.S. PATENT DOCUMENTS

| | | |
|---|---|---|
| 10,953,334 B2 | 3/2021 | Kolen et al. |
| 11,020,667 B2* | 6/2021 | Aronzon ............... A63F 13/537 |
| 2005/0130725 A1 | 6/2005 | Creamer et al. |
| 2006/0223635 A1* | 10/2006 | Rosenberg ............ A63F 13/332 463/37 |
| 2009/0066690 A1 | 3/2009 | Harrison |
| 2010/0029352 A1* | 2/2010 | Angelopoulos ......... A63F 13/95 463/4 |
| 2010/0099472 A1* | 4/2010 | Harris .................... A63F 13/46 463/2 |
| 2010/0137045 A2* | 6/2010 | Angelopoulos ......... A63F 13/65 463/1 |
| 2010/0303293 A1 | 12/2010 | Caduff |
| 2013/0005466 A1 | 1/2013 | Mahajan et al. |
| 2016/0023118 A1* | 1/2016 | Mindes .................. A63F 13/65 463/31 |
| 2016/0101358 A1* | 4/2016 | Ibrahim ............. G06Q 10/0639 463/33 |
| 2018/0132776 A1* | 5/2018 | Flickinger ............... A63F 13/25 |
| 2020/0038757 A1* | 2/2020 | Burnett ................... A63F 13/33 |
| 2021/0038982 A1* | 2/2021 | Guillemette .......... A63F 13/573 |

FOREIGN PATENT DOCUMENTS

| | | |
|---|---|---|
| CN | 109005099 A | 12/2018 |
| CN | 109976852 A | 7/2019 |
| GB | 2417694 A | 3/2006 |

OTHER PUBLICATIONS

Kirk, "Horns Down should become college football's universal hand signal", SBNation, Nov. 29, 2018, https://www.sbnation.com/college-football/2018/11/24/18109550/horns-down-texas-oklahoma-west-virginia-everyone.

International Searching Authority, PCT, PCT/CN2021/093785, Aug. 12, 2021.

* cited by examiner

REAL-WORLD ACTIVITY SIMULATION AUGMENTATION WITH REAL-WORLD DATA OF THE ACTIVITY

BACKGROUND

The present invention relates generally to a method, system, and computer program product for real-world activity simulation. More particularly, the present invention relates to a method, system, and computer program product for real-world activity simulation augmentation with real-world data of the activity.

As used herein, a player is a participant in a real-world activity. The real-world activity is a source of data for an electronic game, or e-game, or game application, played by a gamer.

Game applications that simulate a real-world activity are popular. Game application developers strive to create the most realistic simulations possible of the real world, incorporating increasing levels of detail imported from data of the real-world activity. For example, one popular category of game applications includes games that simulate a real-world sport, such as baseball, basketball, soccer, and North American football. A character in a sports game is intended to perform as closely as possible to his or her real-world counterpart, according to attributes derived from data of the real-world counterpart such as speed, strength, and shooting ability. The simulation extends to a player's simulated in-game appearance, such as the way a particular soccer player stands before taking a free kick. Players are often also affected by environmental factors, such as crowd cheer or taunting, and weather for outdoor games. In addition, players are not simply individual performers with individual sets of statistics, but can also be affected by other members of their team or those they play against. For example, a pair of players on a team might consistently perform better together than when either player is paired with a different player, or a player might perform better when opposing his arch-rival than against a different opponent.

E-games are also spectator sports, in which viewers have access to visual and audio of gamers playing an e-game as well as one or more views of the gamers' performance in the simulated playing field. In addition, environmental factors such as crowd cheer or taunting are communicated back to gamers. Thus, gamers are also affected by these environmental factors.

The illustrative embodiments recognize that, when simulating a real-world activity, updates to the simulation to account for real-world occurrences are important for simulation realism. Thus, data of a player being simulated requires updating, for example every playing season or more frequently, to account for real-world performance, injuries, new skills, muscle atrophy, and mental blocks among other factors. Player data updates are often an important driver of e-game sales, as actual e-game play remains relatively similar between application versions.

The illustrative embodiments also recognize that, collecting performance statistics and other data of every player in a sports league can be time-consuming and expensive, especially for leagues with many players or many games in a season. However, in such sports leagues video and audio clips of important game moments, if not video and audio of an entire game, are typically available for use as a source of player data. Thus, an automated method of collecting player data for use in e-games, using already-existing video and audio data, is desirable.

The illustrative embodiments also recognize that, just as a player's state affects his or her real-world game play, to enhance an e-game's realism the same should be true of the player's simulation in the e-game. For example, if a player is tired, affected by crowd noise or weather, or plays better with a particular teammate, the same should be simulated in the e-game. Thus, there is a need to determine effects of a player's state, as evidenced by visual, audio, and statistical data, on his or her real-world performance to provide a more realistic simulation of that performance. The illustrative embodiments also recognize that, to enhance the experience of an e-game for a gamer and his or her audience, the e-game should also attempt to determine and affect the gamer's state, and collect feedback as to how well the attempt actually affected the gamer's state.

SUMMARY

The illustrative embodiments provide a method, system, and computer program product. An embodiment includes a method that identifies, by analyzing video, audio, and statistical data of a real-world activity, a real-world scenario that is within a threshold similarity of the analyzed video, audio, and statistical data of the real-world activity. The embodiment applies the real-world scenario to a game application that uses the real-world activity as a data source, the applying comprising adjusting a portion of a physics engine, the physics engine simulating a physical phenomenon portrayed in the game application. Thus, the embodiment provides real-world activity simulation augmentation with real-world data of the activity.

In another embodiment, the video, audio, and statistical data comprises data of a player participating in the real-world activity. Thus, the embodiment provides real-world activity simulation augmentation with real-world data of a player participating in the real-world activity.

In another embodiment, the video, audio, and statistical data comprises data of an environmental factor associated with the real-world activity. Thus, the embodiment provides real-world activity simulation augmentation with real-world data of an environmental factor associated with the real-world activity.

In another embodiment, applying the real-world scenario to the game application further comprises adjusting a set of player capability data of the game application, the set of player capability data simulating, within the game application, a capability of a player participating in the real-world activity. Thus, the embodiment provides real-world activity simulation augmentation by adjusting a set of player capability data of a player of the real-world activity.

In another embodiment, applying the real-world scenario to the game application further comprises adjusting an output of a user interface of the game application, the adjusted output intended to alter an experience of a gamer using the game application. Thus, the embodiment provides real-world activity simulation augmentation by altering an experience of a gamer using a game application simulating the real-world activity.

Another embodiment identifies, by analyzing video, audio, and statistical data of a gamer using the game application, a gamer scenario that is within a threshold similarity of the analyzed video, audio, and statistical data of the gamer. The embodiment applies the gamer scenario to the game application, the applying comprising adjusting an output of a user interface of the game application, the adjusted output intended to alter a sentiment of the gamer. Thus, the embodiment provides real-world activity simulation augmentation by altering a sentiment of a gamer using a game application simulating the real-world activity.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
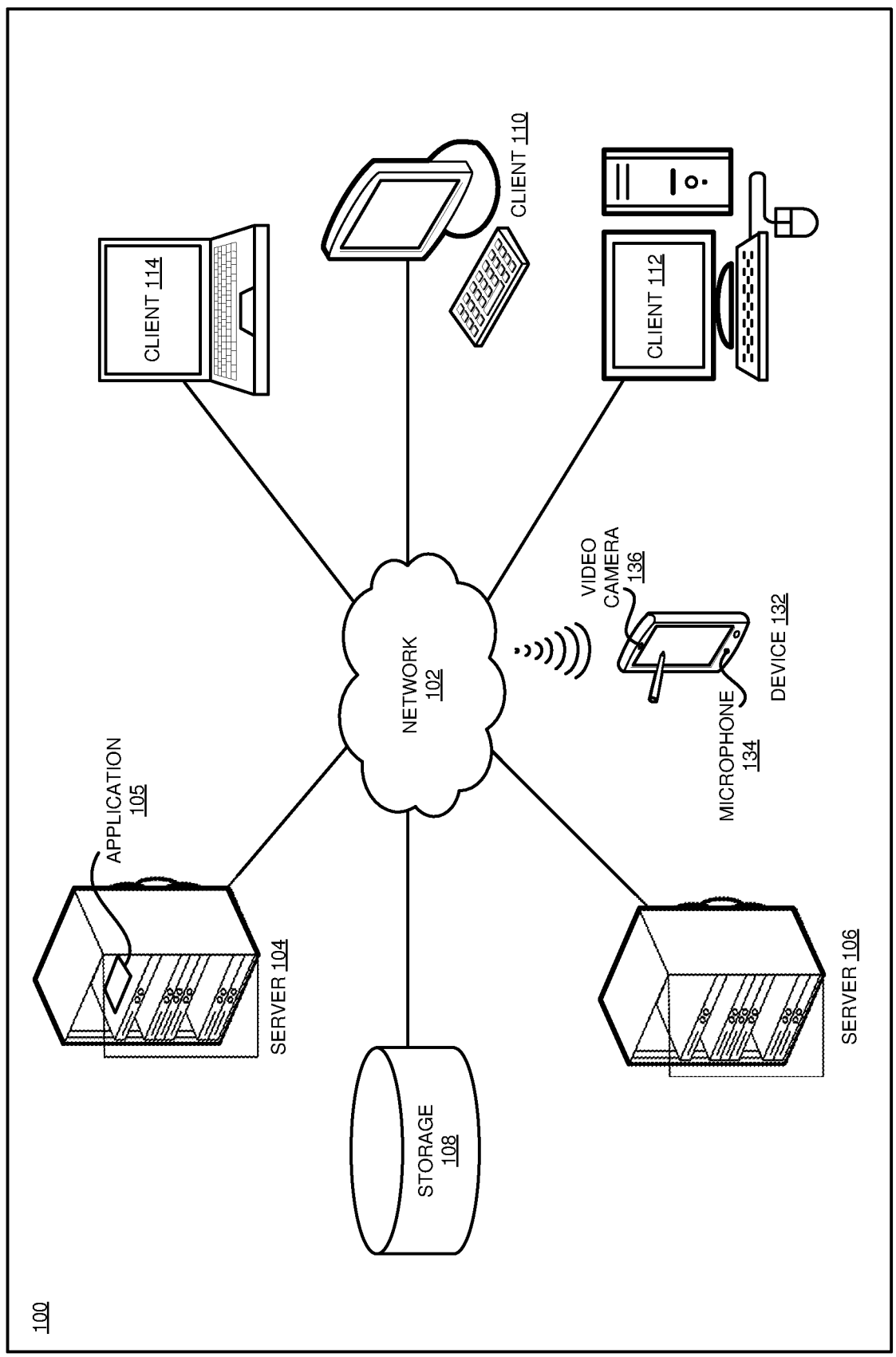
FIG. 1 depicts a block diagram of a network of data processing systems in which illustrative embodiments may be implemented.

The illustrative embodiments recognize that there is an unmet need for an automated method of collecting player and gamer data, determining the effects of that data on the performance of a player or gamer, and incorporating the results into an e-game simulating the player and played by the gamer.

The illustrative embodiments recognize that the presently available tools or solutions do not address these needs or provide adequate solutions for these needs. The illustrative embodiments used to describe the invention generally address and solve the above-described problems and other problems related to real-world activity simulation augmentation with real-world data of the activity.

An embodiment can be implemented as a software application. The application implementing an embodiment can be configured as a modification of an existing simulation system, as a separate application that operates in conjunction with an existing simulation system, a standalone application, or some combination thereof.

Particularly, some illustrative embodiments provide a method that identifies, by analyzing data of a real-world activity, a real-world scenario that is within a threshold similarity of the analyzed data of the real-world activity. The method applies the real-world scenario to a game application that uses the real-world activity as a data source.

An embodiment analyzes data of a real-world activity. In embodiments, the data analyzed includes one or more of video, audio, and statistical data of the real-world activity. In embodiments, the data analyzed includes data of a player of the real-world activity, as well as data that is not specific to a particular player and data of a combination of two or more players.

To analyze the data, an embodiment uses any presently known analysis technique. One embodiment uses noise level measurement, speech to text, natural language text understanding, and other presently known audio processing techniques to extract and determine, from audio data obtained using one or more microphones, a noise level associated with a game's in-person audience, whether the audience is cheering or booing, what players say during particular portions of games, and similar information. Another embodiment uses image recognition, gesture recognition, and other presently known video processing techniques to extract and determine, from video data obtained using one or more video cameras, what happens in a game (e.g., Player A passes the ball to Player B, who scores a goal), a player's typical stance or movements and their game context (e.g. how Player C stands at bat during a baseball game, how Player D raises his arm after successfully making a golf putt), crowd appearance and movements (e.g. the crowd does the wave, signs held by members of the crowd), weather conditions (e.g. whether it is raining or snowing), and similar information. Another embodiment uses a presently-available statistical analysis technique to extract and determine, from numerical data of a player, a game, a set of games, and environmental conditions, statistics of a player (e.g. Player E's batting average in baseball, Player F's free throw scoring percentage in basketball). Statistics of a player include correlations with other statistics. For example, Player G might run faster, by a statistically significant amount, during track meets when the ambient temperature is above 25 degrees Celsius. Statistics of a player also include statistics of the player in relation to other players. For example, a pair of players on a team might consistently perform better together than when either player is paired with a different player, or a player might perform better when opposing his arch-rival than against a different opponent.

An embodiment analyzes data of a gamer playing an e-game. In embodiments, the data analyzed includes one or more of video, audio, and statistical data of the e-game. In embodiments, the data analyzed includes data of a gamer, as well as data that is not specific to a particular gamer and data of a combination of two or more gamers.

To analyze the data, an embodiment uses any presently known analysis technique. One embodiment uses noise level measurement, speech to text, natural language text understanding, and other presently known audio processing techniques to extract and determine, from audio data obtained using one or more microphones, a noise level associated with a e-game's in-person or virtual audience, whether the audience is cheering or booing, what gamers say during particular portions of e-games, and similar information. Another embodiment uses image recognition, gesture recognition, and other presently known video processing techniques to extract and determine, from video data obtained using one or more video cameras, what happens in a e-game (e.g., Gamer A passes a simulated ball to Gamer B, who scores a simulated goal), a gamer's typical stance or movements and their game context (e.g. how Gamer C raises his arm after successfully scoring a simulated goal), crowd appearance and movements, and similar information. Another embodiment uses a presently-available statistical analysis technique to extract and determine, from numerical data of a gamer, an e-game, and a set of e-games, statistics of a gamer (e.g. Gamer D's won-loss record during a set of e-games). Statistics of a gamer also include correlations with other statistics, and of the gamer in relation to other gamers. For example, a pair of gamers on a team might consistently perform better together than when either gamer is paired with a different gamer.

An embodiment represents a result of the real-world activity data analysis by a multidimensional vector, in which each dimension represents a result of the analysis. An embodiment also represents a result of the gamer activity data analysis by a multidimensional vector. For example, a model trained to recognize a particular set of gestures might analyze a video clip in which Player D raises his arm after successfully making a golf putt and score the clip high for a particular recognized gesture, resulting in a vector pointing in a dimension representing the recognized gesture.

An embodiment identifies a real-world scenario, represented by a multidimensional vector, that is within a threshold similarity of the analyzed data of the real-world activity. For example, a vector representing a real-world scenario might include dimensions representing the opposing team, the location of the game, the score of the game, statistics of individual players (e.g. points and rebounds in basketball), the time remaining in the game, positioning of players on the field, the presence of specific teammates, the presence of specific opposing players, crowd noise volume, crowd sentiment derived from noise, crowd sentiment derived from gestures (e.g. hands on head, hands in jacket, hands is air), game prestige or significance, player sentiment derived from gestures (e.g. hands in air, head down, facial expressions), trend of recent results (winning streak, losing streak, points in recent games), and weather conditions. For example, a real-world scenario might be that Player D always raises his arm in a particular recognized after successfully making a golf putt. Another real-world scenario might be that, when a hockey team has a one-player advantage in the third period, and Player G passes the puck to teammate Player H while they are both on offense, Player H has a statistically significant higher chance of scoring than in other circumstances when Player H is playing. An embodiment identifies a gamer scenario, also represented by a multidimensional vector, that is within a threshold similarity of the analyzed data of the gamer activity data. An embodiment determines a real-world or gamer scenario using any presently-available technique, for example a data clustering technique. One embodiment determines similarity using a cosine similarity computation. Cosine similarity measures the cosine of the angle between two vectors in a multi-dimensional space, each vector normalized to a magnitude on a common scale (e.g. between 0 and 1) and each representing a set of data. The smaller the angle, the higher the cosine similarity and hence the more similar the two sets of data are to each other. An embodiment maintains identified real-world and gamer scenarios in a scenario library, for later re-use and further adjustment.

An embodiment applies a real-world scenario to a game application. An embodiment applies a real-world scenario to a game application by adjusting a portion of the game application's physics engine. A physics engine simulates a physical phenomenon portrayed in a simulation. For example, if a simulated basketball player throws a basketball with a specified amount of force from a specified position relative to the basket, the physics engine determines the arc on which the ball travels from the player and whether or not the ball enters a basketball hoop.

Thus, to apply an example real-world scenario in which Player A is encouraged by a cheering crowd or plays better with Player B than with other teammates, an embodiment alters a parameter governing the physics engine's calculations to make a result consistent with improved performance more likely to occur. For example, a physics engine used to simulate a basketball game might be altered to lower the position of the simulated basketball hoop, lower the force of gravity, or move Player A's simulated position closer to the simulated hoop. As a result, Player A's simulated shot will have a higher likelihood of success than it would have had without altering the physics engine, consistent with the effect of the improved performance in the scenario. As another example, a physics engine used to simulate a soccer game might alter a simulated soccer field to place the opposing team's goal downhill from midfield, making it easier for Player A to run towards the goal and for Player A's shot to score. On the other hand, to apply an example real-world scenario in which Player C is discouraged by a booing crowd or an extra-hot day, an embodiment alters a parameter governing the physics engine's calculations to make a result consistent with diminished performance more likely to occur. For example, the basketball physics engine might be altered to raise the position of the simulated basketball hoop, raise the force of gravity, or move Player C's simulated position farther from the simulated hoop. As a result, Player C's simulated shot will have a lower likelihood of success than it would have had without altering the physics engine, consistent with the effect of the diminished performance in the scenario. As another example, the soccer physics engine might alter a simulated soccer field to place the opposing team's goal uphill from midfield, making it harder for Player A to run towards the goal and for Player A's shot to score.

Of note, an embodiment adjusts a portion of the game application's physics engine without altering an appearance of the e-game to an e-gamer or e-game spectator, thus preserving the realistic appearance of the e-game. For example, if an embodiment lowers the position of the simulated basketball hoop in the physics engine, the simulated basketball hoop continues to appear at normal height.

Thus, the physics engine adjustment only affects the movement of a physical phenomenon being simulated, not the appearance of that simulated.

An embodiment applies a real-world scenario to a game application by adjusting a set of player capability data of the game application. A set of player capability data simulates a capability of the player within the game application. For example, a set of player capability data for a basketball e-game might include Player A's height and the force with which Player A is simulated to shoot. Thus, to apply an example real-world scenario in which Player A is encouraged by a cheering crowd or plays better with Player B than with other teammates, an embodiment alters simulated Player A's capability data to raise Player A's height or increase the force with which Player A is simulated to shoot. As a result, Player A's simulated shot will have a higher likelihood of success than it would have had without adjusting simulated Player A's capability data, consistent with the effect of the improved performance in the scenario. On the other hand, to apply an example real-world scenario in which Player C is discouraged by a booing crowd or an extra-hot day, an embodiment alters simulated Player C's capability data to lower Player C's height or decrease the force with which Player C is simulated to shoot. As a result, Player C's simulated shot will have a lower likelihood of success than it would have had without adjusting simulated Player C's capability data, consistent with the effect of the diminished performance in the scenario.

An embodiment applies a real-world scenario to a game application by adjusting an output of a user interface of the game application. The adjusted output is intended to alter an experience of a gamer using the game application. For example, to apply an example real-world scenario in which Player D is attempting a difficult shot, an embodiment might cause the game controller input device of a gamer simulating Player D to shake, or generate simulated encouraging shouts from a simulated crowd.

An embodiment identifies a gamer scenario, represented by a multidimensional vector, that is within a threshold similarity of the analyzed data of the gamer activity. For example, a vector representing a gamer scenario might include dimensions representing any of the dimensions described herein with respect to a real-world scenario. As another example, a vector representing a gamer scenario might include gamer-specific dimensions such as the opposing gamer or non-human virtual opponent, prestige or significance in an e-game context, trend of recent results (winning streak, losing streak, points in recent games) in e-game game context, physical location of gamer, game settings (e.g. difficulty, sensitivity), noise level in a gamer's physical environment, noise sentiment in a gamer's physical environment, observed gamer gestures (e.g. hands raised, hands on head), presence of crowd in a physical location, and gestures of crowd in physical location. The gamer's physical environment is the physical environment in which a gamer is interacting with an e-game—for example, an e-gamer's room in a home, a conference room, or an arena. For example, a gamer scenario might be that Gamer E is attempting a difficult shot in an e-game. An embodiment has caused Gamer E's game controller to shake, indicating the difficulty, but the shaking is too violent and Gamer E has responded by dropping the game controller (detected by analyzing visual data of Gamer E) and missing the simulated shot.

As a result, an embodiment applies the gamer scenario to the game application, by adjusting an output of a user interface of the game application. The adjusted output is intended to further alter an experience or sentiment of a gamer using the game application. For example, if an embodiment caused Gamer E's game controller to shake too violently and Gamer E responded by dropping the game controller, the next time this gamer scenario is identified an embodiment causes Gamer E's game controller to shake less violently than before, causing the intended experience (a difficulty indication) rather than an unintended experience (dropping the controller).

The manner of real-world activity simulation augmentation with real-world data of the activity described herein is unavailable in the presently available methods in the technological field of endeavor pertaining to real-world simulation. A method of an embodiment described herein, when implemented to execute on a device or data processing system, comprises substantial advancement of the functionality of that device or data processing system in identifying, by analyzing video, audio, and statistical data of a real-world activity, a real-world scenario that is within a threshold similarity of the analyzed data of the real-world activity. The method applies the real-world scenario to a game application that uses the real-world activity as a data source, including adjusting a portion of the game application's physics engine, adjusting a set of player capability data of the game application, and adjusting an output of the game application's user interface.

The illustrative embodiments are described with respect to certain types of activity data, player data, gamer data, scenarios, user interfaces, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
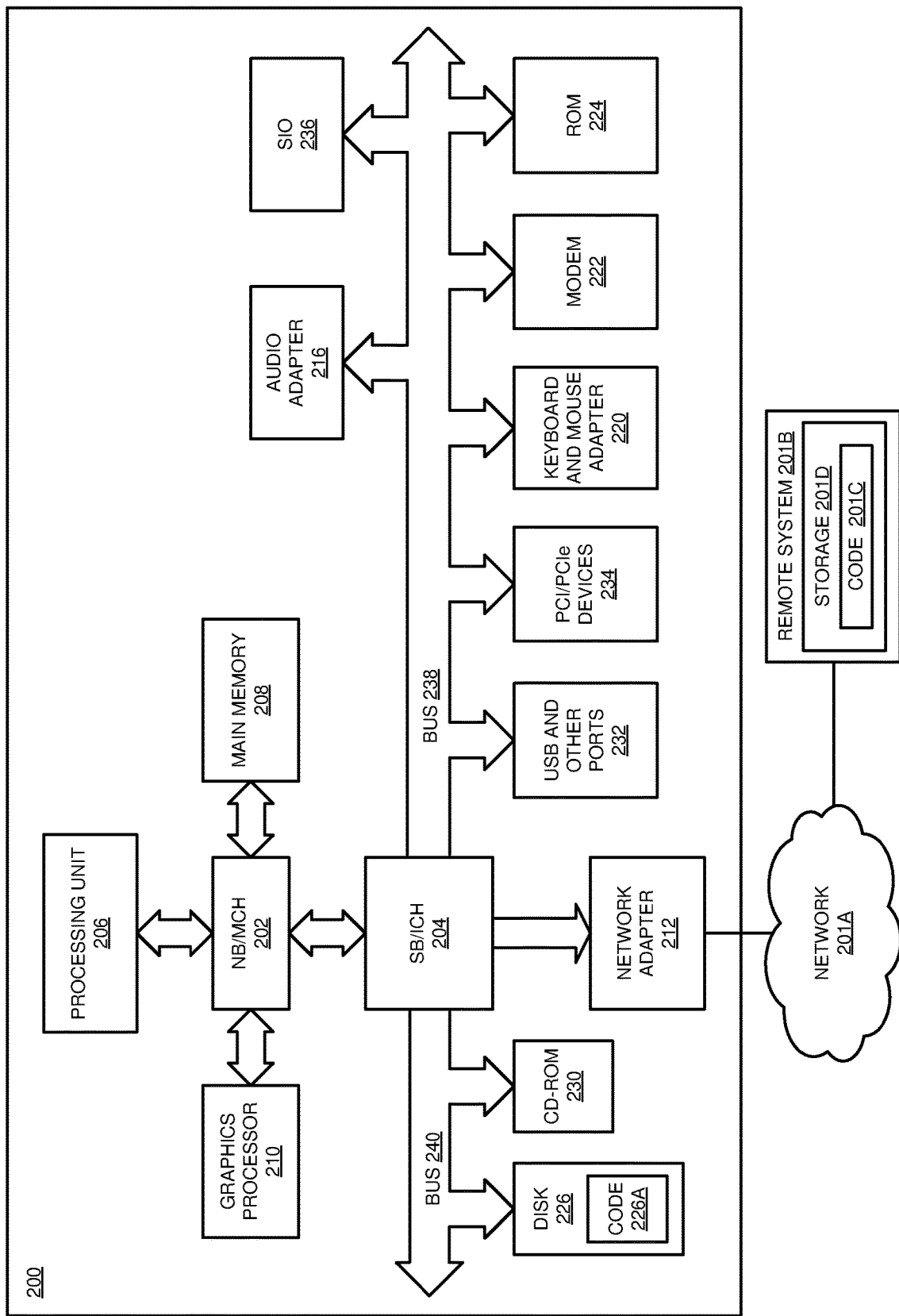
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes microphone 134 and video camera 136, which are usable to collect audio and video data of a real-world activity as described herein. Alternatively, microphone 134 and video camera 136 can be located in another device and communicate with any of servers 104 and 106, clients 110, 112, and 114, and device 132 via network 102.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
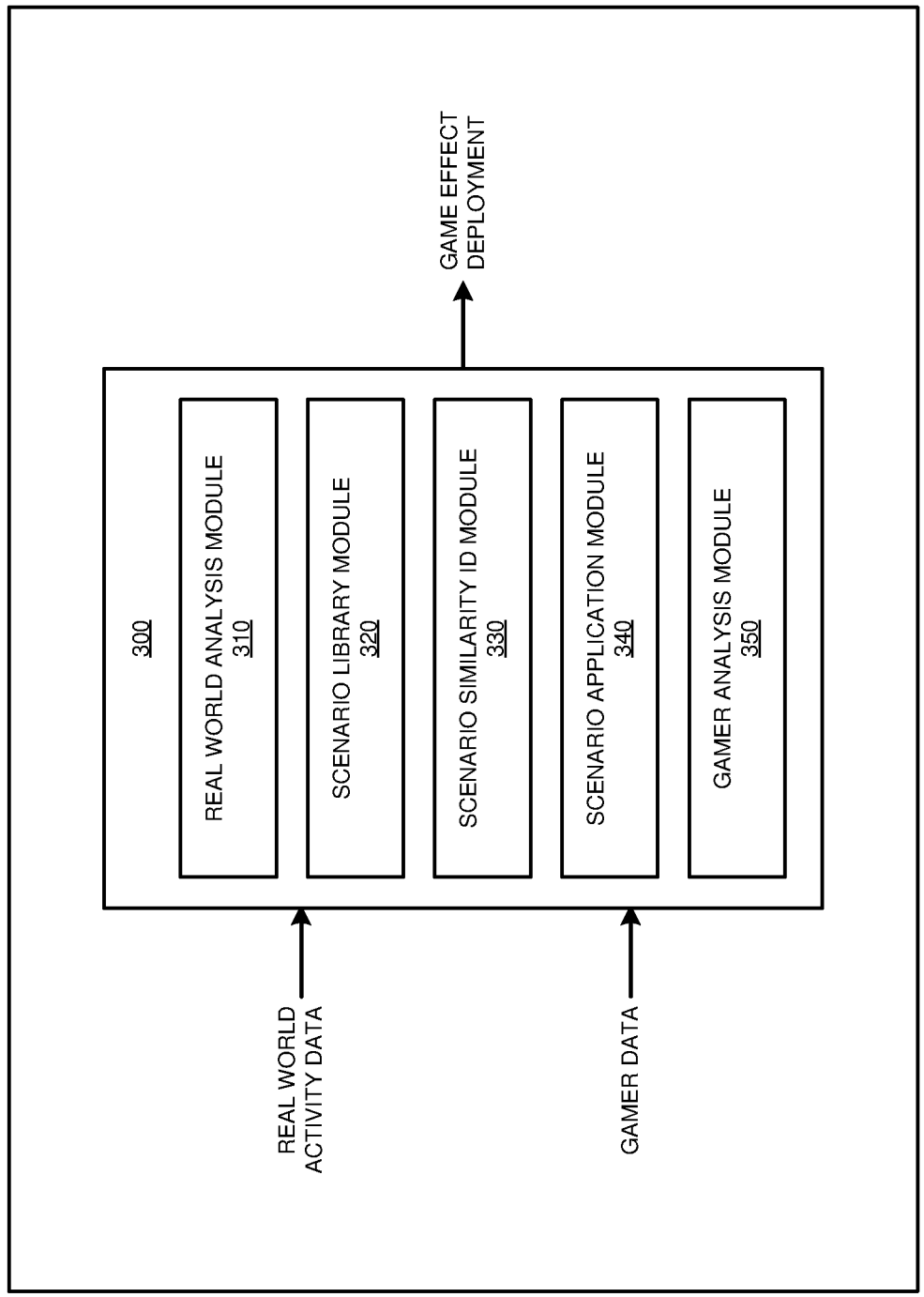
FIG. 3 depicts a block diagram of an example configuration for real-world activity simulation augmentation with real-world data of the activity in accordance with an illustrative embodiment.

With reference to FIG. 3, this figure depicts a block diagram of an example configuration for real-world activity simulation augmentation with real-world data of the activity in accordance with an illustrative embodiment. Application 300 is an example of application 105 in FIG. 1 and executes in any of servers 104 and 106, clients 110, 112, and 114, and device 132 in FIG. 1.

Real world analysis module 310 analyzes data of a real-world activity, including one or more of video, audio, and statistical data of the real-world activity. Implementations of module 310 analyze data of a player of the real-world activity, as well as data that is not specific to a particular player and data of a combination of two or more players.

To analyze the data, module 310 uses any presently known analysis technique. Thus, module 310 uses noise level measurement, speech to text, natural language text understanding, and other presently known audio processing techniques to extract and determine, from audio data obtained using one or more microphones, a noise level associated with a game's in-person audience, whether the audience is cheering or booing, what players say during particular portions of games, and similar information. Module 310 uses image recognition, gesture recognition, and other presently known video processing techniques to extract and determine, from video data obtained using one or more video cameras, what happens in a game, a player's typical stance or movements and their game context, crowd appearance and movements, weather conditions, and similar information. Module 310 uses a presently-available statistical analysis technique to extract and determine, from numerical data of a player, a game, a set of games, and environmental conditions, statistics of a player. Statistics of a player include correlations with other statistics and statistics of the player in relation to other players.

Gamer analysis module 350 analyzes data of a gamer playing an e-game, including one or more of video, audio, and statistical data of the e-game. Implementations of module 350 analyze data of a gamer, as well as data that is not specific to a particular gamer and data of a combination of two or more gamers.

To analyze the data, module 350 uses any presently known analysis technique. One implementation of module 350 uses noise level measurement, speech to text, natural language text understanding, and other presently known audio processing techniques to extract and determine, from audio data obtained using one or more microphones, a noise level associated with a e-game's in-person or virtual audience, whether the audience is cheering or booing, what gamers say during particular portions of e-games, and similar information. Another implementation of module 350 uses image recognition, gesture recognition, and other presently known video processing techniques to extract and determine, from video data obtained using one or more video cameras, what happens in a e-game, a gamer's typical stance or movements and their game context, crowd appearance and movements, and similar information. Another implementation of module 350 uses a presently-available statistical analysis technique to extract and determine, from numerical data of a gamer, an e-game, and a set of e-games, statistics of a gamer. Statistics of a gamer also include correlations with other statistics, and of the gamer in relation to other gamers.

Module 310 represents a result of the real-world activity data analysis by a multidimensional vector, in which each dimension represents a result of the analysis. Module 350 represents a result of the gamer activity data analysis by a multidimensional vector.

Scenario similarity identification module 330 identifies a real-world scenario, represented by a multidimensional vector, that is within a threshold similarity of the analyzed data of the real-world activity. Module 330 also identifies a gamer scenario, also represented by a multidimensional vector, that is within a threshold similarity of the analyzed data of the gamer activity data. Module 330 determines a real-world or gamer scenario using any presently-available technique, for example a data clustering technique. One implementation of module 330 determines similarity using a cosine similarity computation.

Scenario library module 320 maintains identified real-world and gamer scenarios in a scenario library, for later re-use and further adjustment.

Scenario application module 340 applies a real-world scenario to a game application, by adjusting a portion of the game application's physics engine, adjusting a set of player capability data of the game application, or adjusting an output of a user interface of the game application. Scenario application module 340 also applies a gamer scenario to the game application, by adjusting an output of a user interface of the game application. The adjusted output is intended to further alter an experience or sentiment of a gamer using the game application.

Figure 4:
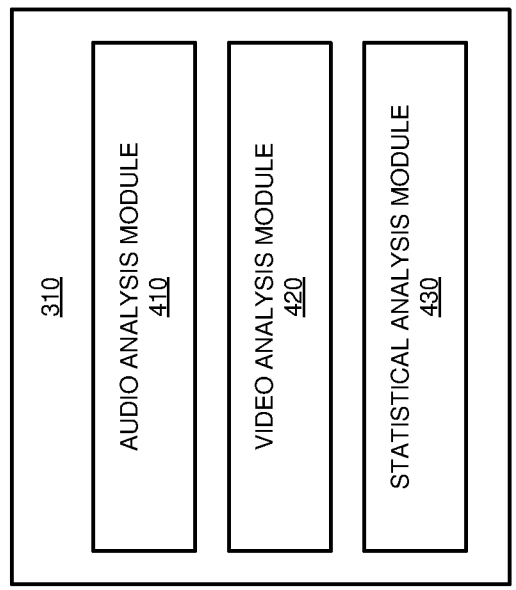
FIG. 4 depicts a block diagram of an example configuration for real-world activity simulation augmentation with real-world data of the activity in accordance with an illustrative embodiment.

With reference to FIG. 4, this figure depicts a block diagram of an example configuration for real-world activity simulation augmentation with real-world data of the activity in accordance with an illustrative embodiment. In particular, FIG. 4 provides more detail of module 310 in FIG. 3.

Audio analysis module 410 uses noise level measurement, speech to text, natural language text understanding, and other presently known audio processing techniques to extract and determine, from audio data obtained using one or more microphones, a noise level associated with a game's in-person audience, whether the audience is cheering or booing, what players say during particular portions of games, and similar information. Video analysis module 420 uses image recognition, gesture recognition, and other presently known video processing techniques to extract and determine, from video data obtained using one or more video cameras, what happens in a game, a player's typical stance or movements and their game context, crowd appearance and movements, weather conditions, and similar information. Statistical analysis module 430 uses a presently-available statistical analysis technique to extract and determine, from numerical data of a player, a game, a set of games, and environmental conditions, statistics of a player. Statistics of a player include correlations with other statistics and statistics of the player in relation to other players.

Figure 5:
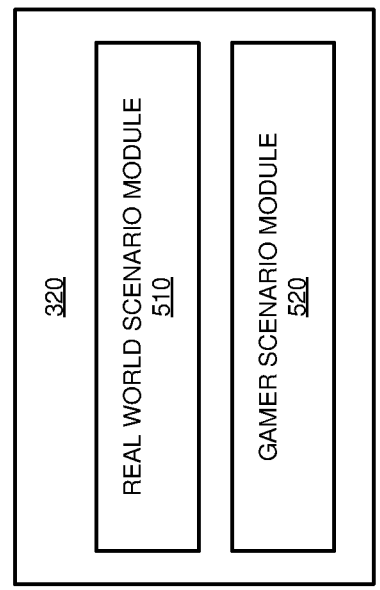
FIG. 5 depicts a block diagram of an example configuration for real-world activity simulation augmentation with real-world data of the activity in accordance with an illustrative embodiment.

With reference to FIG. 5, this figure depicts a block diagram of an example configuration for real-world activity simulation augmentation with real-world data of the activity in accordance with an illustrative embodiment. In particular, FIG. 5 provides more detail of module 320 in FIG. 3.

Real world scenario module 510 maintains identified real-world scenarios in a scenario library, for later re-use and further adjustment. Similarly, gamer scenario module 520 maintains identified gamer scenarios in a scenario library, for later re-use and further adjustment.

Figure 6:
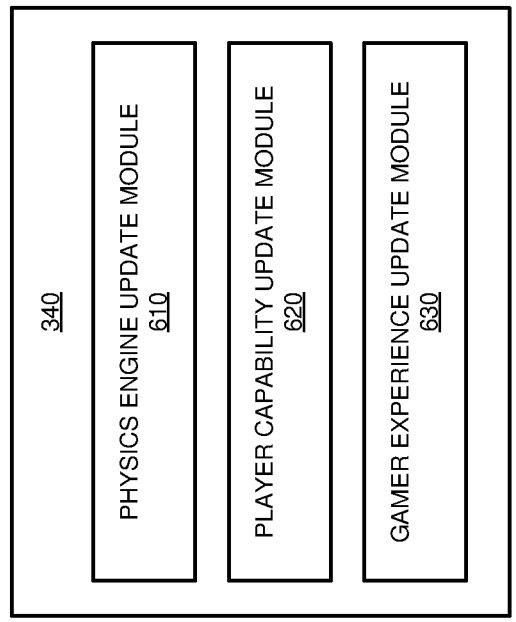
FIG. 6 depicts a block diagram of an example configuration for real-world activity simulation augmentation.

With reference to FIG. 6, this figure depicts a block diagram of an example configuration for real-world activity simulation augmentation with real-world data of the activity in accordance with an illustrative embodiment. In particular, FIG. 6 provides more detail of module 340 in FIG. 3.

In particular, physics engine update module 610 applies a real-world scenario to a game application by adjusting a portion of the game application's physics engine. Player capability update module 620 applies a real-world scenario to a game application by adjusting a set of player capability data of the game application. Gamer experience update module 630 applies a real-world or gamer scenario to a game application by adjusting an output of a user interface of the game application, to alter an experience or sentiment of a gamer using the game application.

Figure 7:
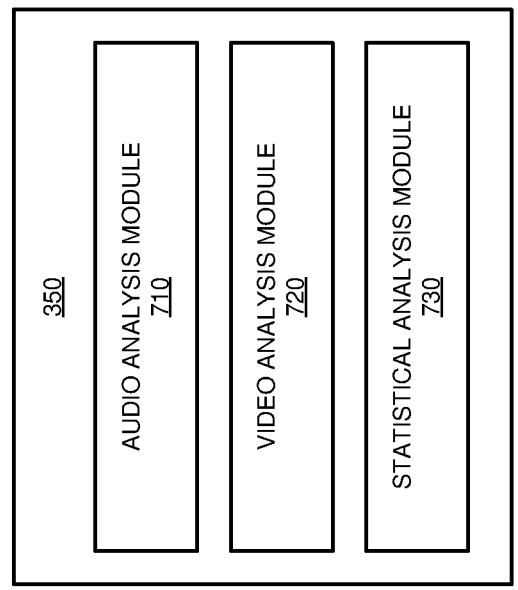
FIG. 7 depicts a block diagram of an example configuration for real-world activity simulation augmentation with real-world data of the activity in accordance with an illustrative embodiment.

With reference to FIG. 7, this figure depicts a block diagram of an example configuration for real-world activity simulation augmentation with real-world data of the activity in accordance with an illustrative embodiment. In particular, FIG. 7 provides more detail of module 350 in FIG. 3.

Audio analysis module 710 uses noise level measurement, speech to text, natural language text understanding, and other presently known audio processing techniques to extract and determine, from audio data obtained using one or more microphones, a noise level associated with a gamer's audience, whether the audience is cheering or booing, what gamers say during particular portions of games, and similar information. Video analysis module 720 uses image recognition, gesture recognition, and other presently known video processing techniques to extract and determine, from video data obtained using one or more video cameras, what happens in an e-game, a gamer's typical stance or movements and their e-game context, crowd appearance, and similar information. Statistical analysis module 730 uses a presently-available statistical analysis technique to extract and determine, from numerical data of a gamer, an e-game, or a set of e-games, statistics of a gamer, including correlations with other statistics and statistics of the gamer in relation to other gamers.

Figure 8:
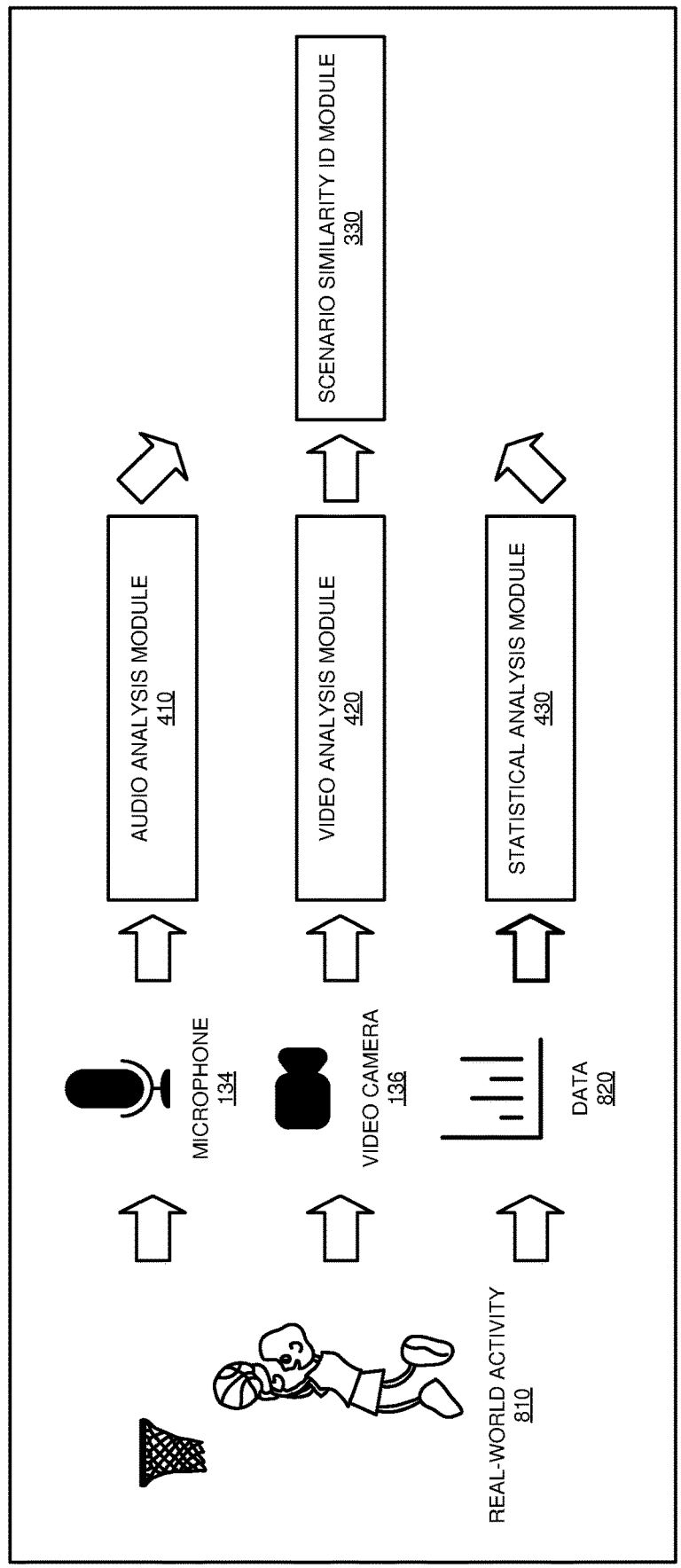
FIG. 8 depicts an example of real-world activity simulation augmentation with real-world data of the activity in accordance with an illustrative embodiment.

With reference to FIG. 8, this figure depicts an example of real-world activity simulation augmentation with real-world data of the activity in accordance with an illustrative embodiment. The example can be executed using application 300 in FIG. 3. Microphone 134 and video camera 136 are the same as microphone 134 and video camera 136 in FIG. 1. Scenario similarity identification module 330 is the same as scenario similarity identification module 330 in FIG. 3. Audio analysis module 410, video analysis module 420, and statistical analysis module 430 are the same as audio analysis module 410, video analysis module 420, and statistical analysis module 430 in FIG. 4.

As depicted, application 300 uses microphone 134 and video camera 136 to collect data of real-world activity 810. Data 820 is numerical data of activity 810. Audio analysis module 410 uses noise level measurement, speech to text, natural language text understanding, and other presently known audio processing techniques to extract and determine, from audio data of activity 810, a noise level associated with a game's in-person audience, whether the audience is cheering or booing, what players say during particular portions of games, and similar information. Video analysis module 420 uses image recognition, gesture recognition, and other presently known video processing techniques to extract and determine, from video data of activity 810, what happens in a game, a player's typical stance or movements and their game context, crowd appearance and movements, weather conditions, and similar information. Statistical analysis module 430 uses a presently-available statistical analysis technique to extract and determine, from data 820, data of a player, a game, a set of games, and environmental conditions, statistics of a player, correlations with other statistics, and statistics of the player in relation to other players. The results are passed to scenario similarity identification module 330.

Figure 9:
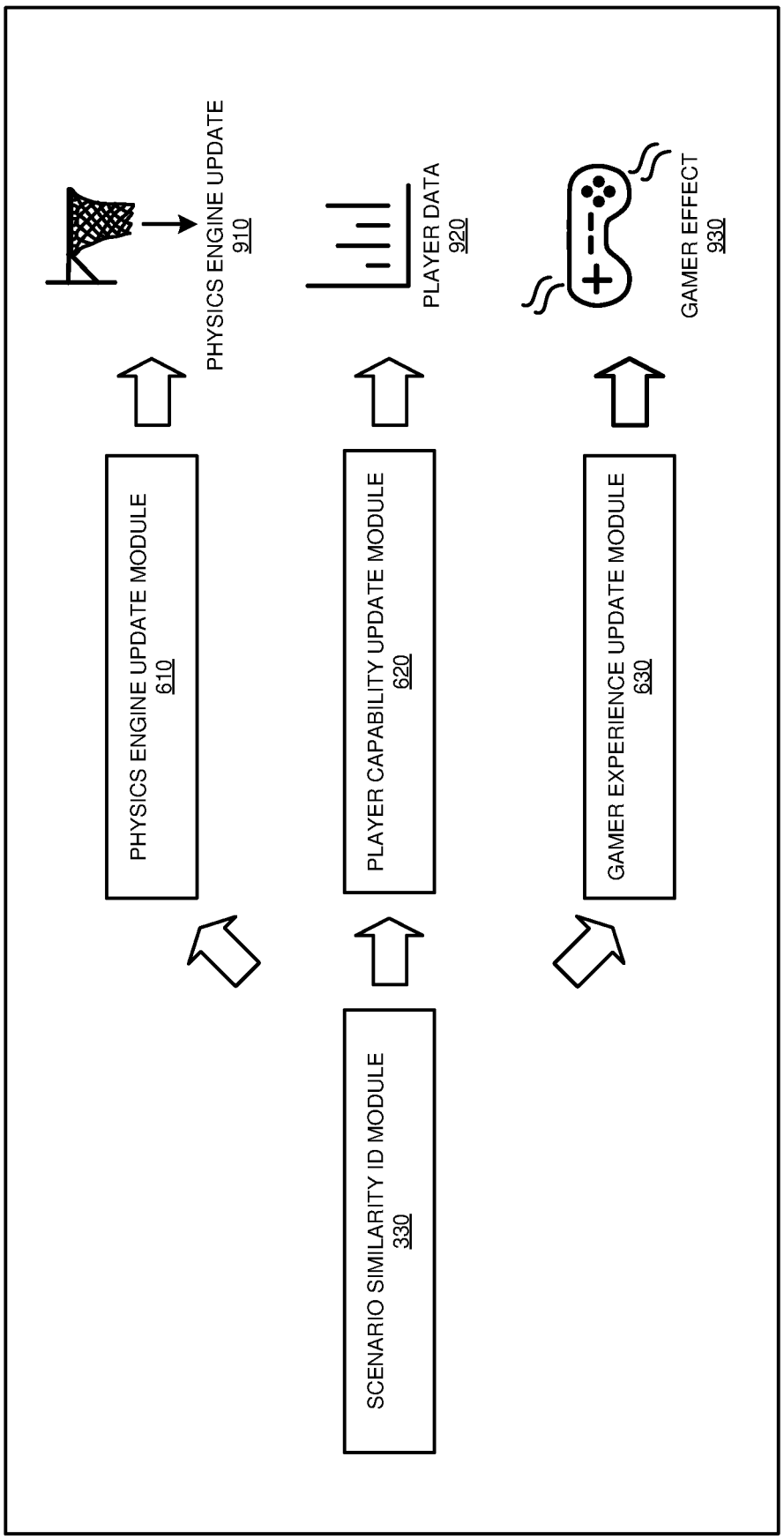
FIG. 9 depicts a continued example of real-world activity simulation augmentation with real-world data of the activity in accordance with an illustrative embodiment.

With reference to FIG. 9, this figure depicts a continued example of real-world activity simulation augmentation with real-world data of the activity in accordance with an illustrative embodiment. The example can be executed using application 300 in FIG. 3. Scenario similarity identification module 330 is the same as scenario similarity identification module 330 in FIG. 3. Physics engine update module 610, player capability update module 620, and gamer experience update module 630 are the same as physics engine update module 610, player capability update module 620, and gamer experience update module 630 in FIG. 6.

As depicted, based on a real-world scenario identified by module 330, physics engine update module 610 applies the scenario to a game application by adjusting a portion of the game application's physics engine, resulting in physics engine update 910. As depicted, within the physics engine the position of the simulated basketball hoop has been lowered to improve the likelihood of success of a player's simulated shot, consistent with the effect of the improved performance in the scenario. Similarly, player capability update module 620 applies the scenario to a game application by adjusting a set of player capability data of the game application, resulting in player capability data 920. Gamer experience update module 630 applies the scenario to a game application by adjusting an output of a user interface of the game application, resulting in gamer effect 930, in which the game controller of a gamer is shaken to alter an experience or sentiment of a gamer using the game application.

Figure 10:
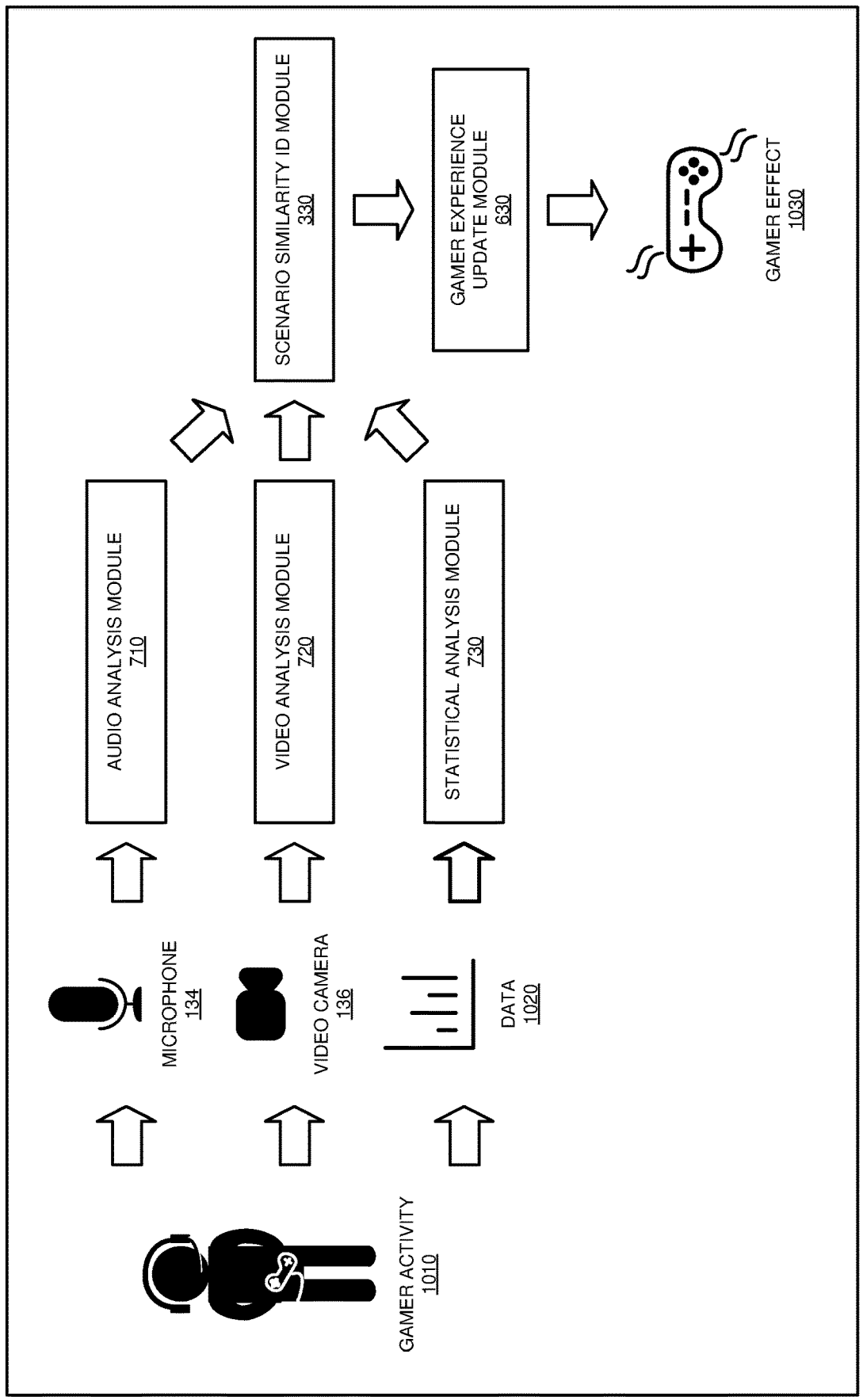
FIG. 10 depicts a continued example of real-world activity simulation augmentation with real-world data of the activity in accordance with an illustrative embodiment.

With reference to FIG. 10, this figure depicts a continued example of real-world activity simulation augmentation with real-world data of the activity in accordance with an illustrative embodiment. The example can be executed using application 300 in FIG. 3. Microphone 134 and video camera 136 are the same as microphone 134 and video camera 136 in FIG. 1. Scenario similarity identification module 330 is the same as scenario similarity identification module 330 in FIG. 3. Gamer experience update module 630 is the same as gamer experience update module 630 in FIG. 6. Audio analysis module 710, video analysis module 720, and statistical analysis module 730 are the same as audio analysis module 710, video analysis module 720, and statistical analysis module 730 in FIG. 7.

As depicted, application 300 uses microphone 134 and video camera 136 to collect data of gamer activity 1010. Data 1020 is numerical data of activity 1010. Audio analysis module 710 uses noise level measurement, speech to text, natural language text understanding, and other presently known audio processing techniques to extract and determine, from audio data of activity 1010, a noise level associated with an e-game's audience, whether the audience is cheering or booing, what gamers say during particular portions of e-games, and similar information. Video analysis module 720 uses image recognition, gesture recognition, and other presently known video processing techniques to extract and determine, from video data of activity 1010, what happens in an e-game, a gamer's typical stance or movements and their e-game context, crowd appearance and movements, and similar information. Statistical analysis module 730 uses a presently-available statistical analysis technique to extract and determine, from data 1020, data of a gamer, an e-game, a set of e-games, statistics of a gamer, correlations with other statistics, and statistics of the gamer in relation to other gamer. The results are passed to scenario similarity identification module 330. Based on a gamer scenario identified by module 330, module 630 applies the scenario to a game application by adjusting an output of a user interface of the game application, resulting in gamer effect 1030, in which the game controller of a gamer is shaken to alter an experience or sentiment of a gamer using the game application.

Figure 11:
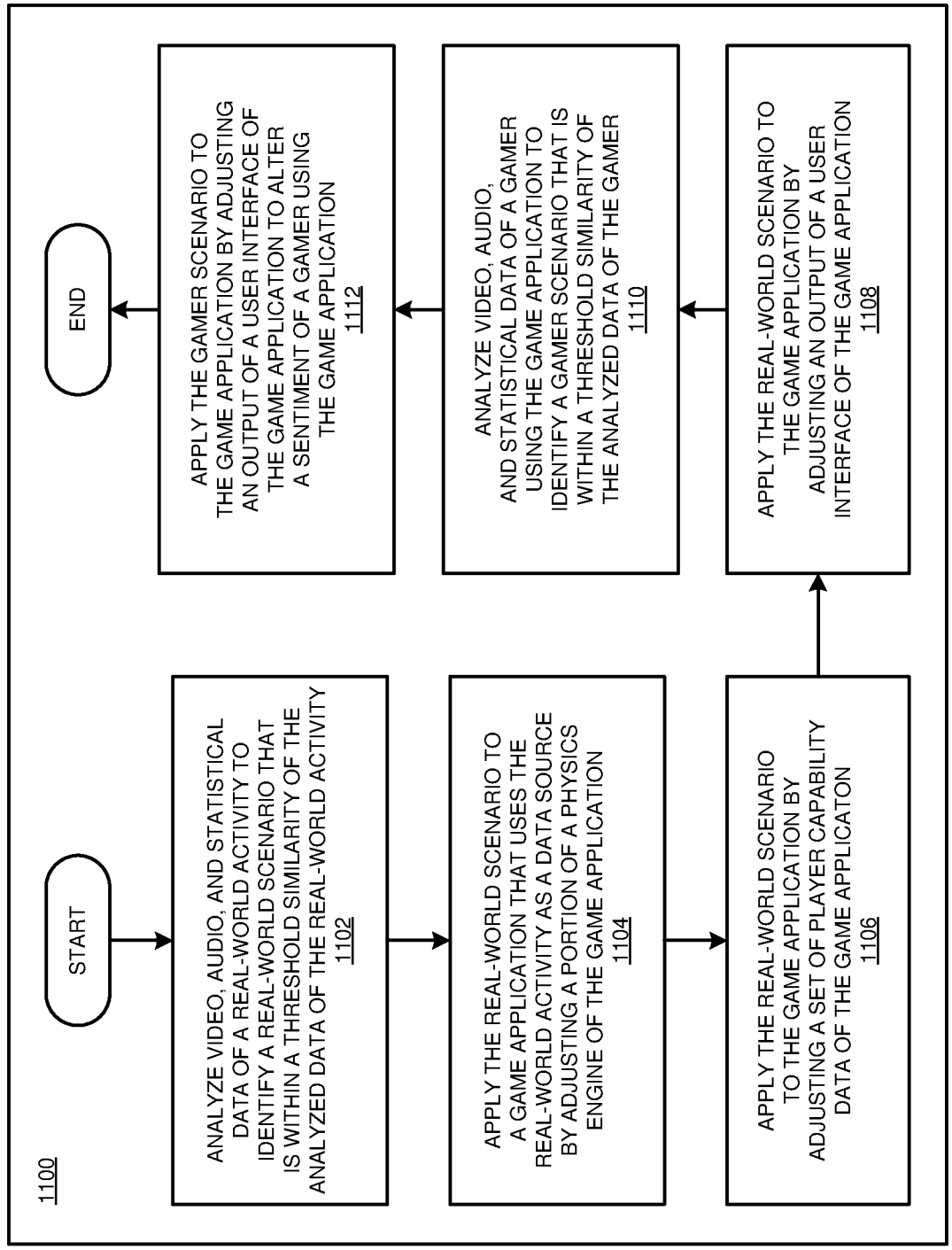
FIG. 11 depicts a flowchart of an example process for real-world activity simulation augmentation with real-world data of the activity in accordance with an illustrative embodiment.

With reference to FIG. 11, this figure depicts a flowchart of an example process for real-world activity simulation augmentation with real-world data of the activity in accordance with an illustrative embodiment. Process 1100 can be implemented in application 300 in FIG. 3.

In block 1102, the application analyzes video, audio, and statistical data of a real-world activity to identify a real-world scenario that is within a threshold similarity of the analyzed data of the real-world activity. In block 1104, the application applies the real-world scenario to a game application that uses the real-world activity as a data source by adjusting a portion of a physics engine of the game application. In block 1106, the application applies the real-world scenario to the game application by adjusting a set of player capability data of the game application. In block 1108, the application applies the real-world scenario to the game application by adjusting an output of a user interface of the game application. In block 1110, the application analyzes video, audio, and statistical data of a gamer using the game application to identify a gamer scenario that is within a threshold similarity of the analyzed data of the gamer. In block 1112, the application applies the gamer scenario to the game application by adjusting an output of a user interface of the game application to alter a sentiment of a gamer using the game application. Then the application ends.

Figure 12:
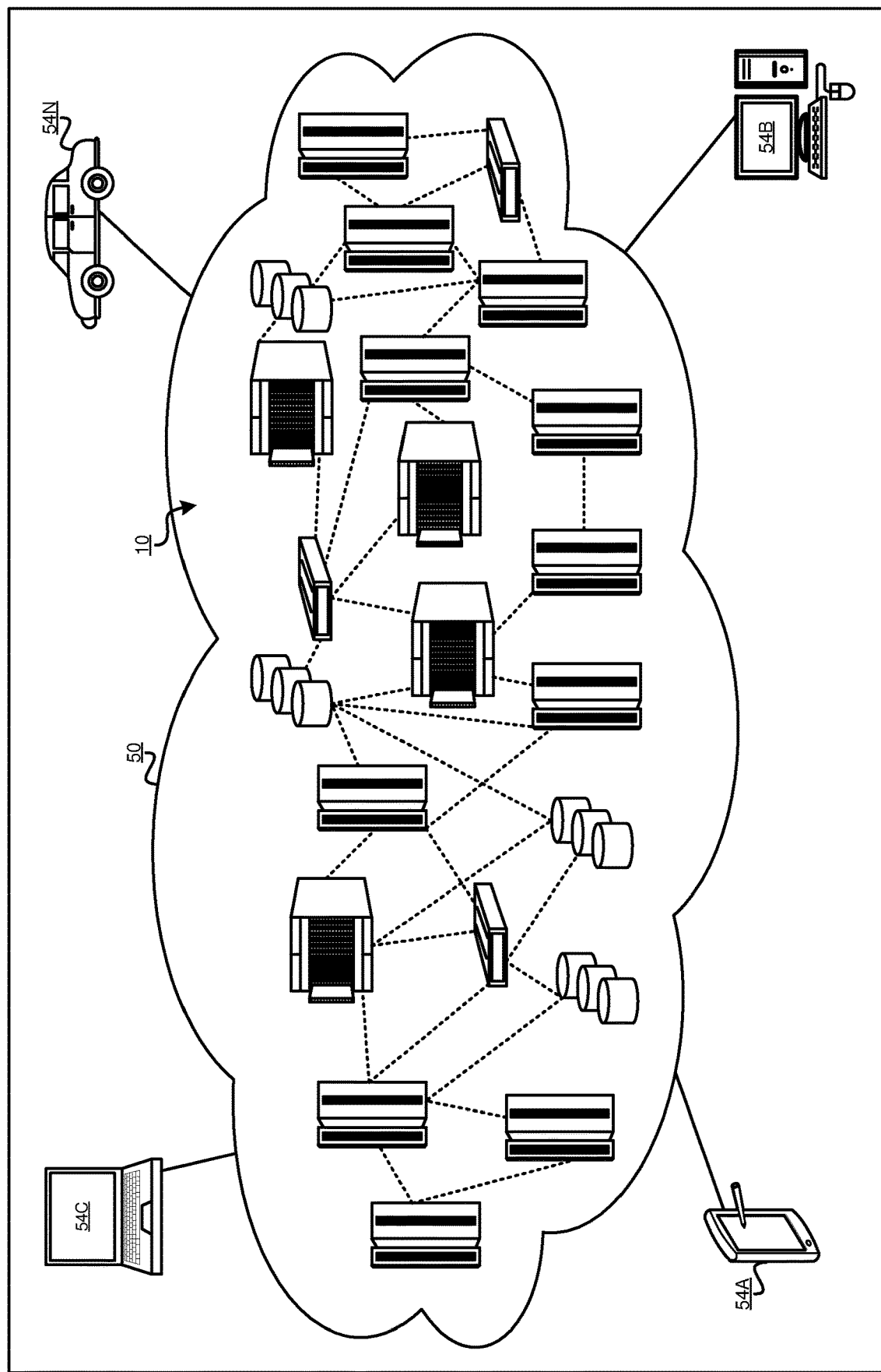
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 13:
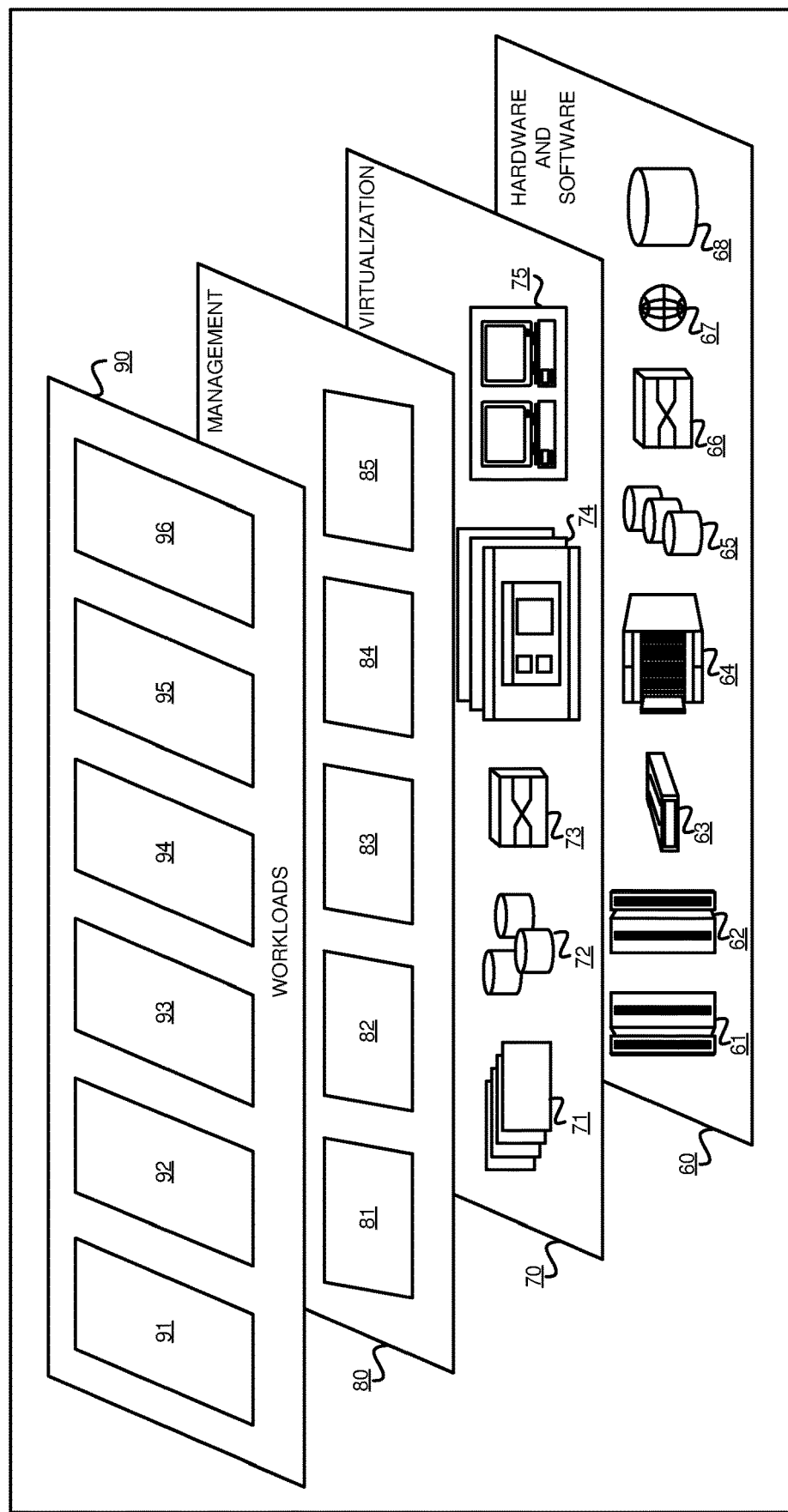
FIG. 13 depicts abstraction model layers according to an embodiment of the present invention.

Referring now to FIG. 13, a set of functional abstraction layers provided by cloud computing environment 50 (FIG.

12) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for real-world activity simulation augmentation with real-world data of the activity and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, by analyzing video, audio, and statistical data of a real-world activity, a real-world scenario that is within a threshold similarity of the analyzed video, audio, and statistical data of the real-world activity; and
   applying the real-world scenario to a game application that uses the real-world activity as a data source, the applying comprising altering a parameter governing calculation, by a physics engine, of a simulated path of an object portrayed in the game application, the altered parameter affecting simulation, by the physics engine, of the object being simulated to increase a likelihood of a result consistent with the real-world scenario, a simulated appearance of the object remaining unchanged responsive to the altered parameter.

2. The computer-implemented method of claim 1, wherein the video, audio, and statistical data comprises data of a player participating in the real-world activity.

3. The computer-implemented method of claim 1, wherein the video, audio, and statistical data comprises data of an environmental factor associated with the real-world activity.

4. The computer-implemented method of claim 1, wherein applying the real-world scenario to the game application further comprises adjusting a set of player capability data of the game application, the set of player capability data simulating, within the game application, a capability of a player participating in the real-world activity.

5. The computer-implemented method of claim 1, wherein applying the real-world scenario to the game application further comprises adjusting an output of a user interface of the game application, the adjusted output intended to alter an experience of a gamer using the game application.

6. The computer-implemented method of claim 1, further comprising:
   identifying, by analyzing video, audio, and statistical data of a gamer using the game application, a gamer scenario that is within a threshold similarity of the analyzed video, audio, and statistical data of the gamer; and
   applying the gamer scenario to the game application, the applying comprising adjusting an output of a user interface of the game application, the adjusted output intended to alter a sentiment of the gamer.

7. A computer program product for real-world activity simulation augmentation with real-world data of a real-world activity, the computer program product comprising:
   one or more computer readable storage media, and program instructions collectively stored on the one or more computer readable storage media, the program instructions comprising:
   program instructions to identify, by analyzing video, audio, and statistical data of a real-world activity, a real-world scenario that is within a threshold similarity of the analyzed video, audio, and statistical data of the real-world activity; and
   program instructions to apply the real-world scenario to a game application that uses the real-world activity as a data source, the applying comprising altering a parameter governing calculation, by a physics engine, of a simulated path of an object portrayed in the game application, the altered parameter affecting simulation, by the physics engine, of the object being simulated to increase a likelihood of a result consistent with the real-world scenario, a simulated appearance of the object remaining unchanged responsive to the altered parameter.

8. The computer program product of claim 7, wherein the video, audio, and statistical data comprises data of a player participating in the real-world activity.

9. The computer program product of claim 7, wherein the video, audio, and statistical data comprises data of an environmental factor associated with the real-world activity.

10. The computer program product of claim 7, wherein program instructions to apply the real-world scenario to the game application further comprises program instructions to adjust a set of player capability data of the game application, the set of player capability data simulating, within the game application, a capability of a player participating in the real-world activity.

11. The computer program product of claim 7, wherein program instructions to apply the real-world scenario to the game application further comprises program instructions to adjust an output of a user interface of the game application, the adjusted output intended to alter an experience of a gamer using the game application.

12. The computer program product of claim 7, further comprising:
    program instructions to identify, by analyzing video, audio, and statistical data of a gamer using the game application, a gamer scenario that is within a threshold similarity of the analyzed video, audio, and statistical data of the gamer; and
    program instructions to apply the gamer scenario to the game application, the applying comprising adjusting an output of a user interface of the game application, the adjusted output intended to alter a sentiment of the gamer.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising:
    one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to identify, by analyzing video, audio, and statistical data of a real-world activity, a real-world scenario that is within a threshold similarity of the analyzed video, audio, and statistical data of the real-world activity; and
    program instructions to apply the real-world scenario to a game application that uses the real-world activity as a data source, the applying comprising altering a parameter governing calculation, by a physics engine, of a simulated path of an object portrayed in the game application, the altered parameter affecting simulation, by the physics engine, of the object being simulated to increase a likelihood of a result consistent with the real-world scenario, a simulated appearance of the object remaining unchanged responsive to the altered parameter.

17. The computer system of claim 16, wherein the video, audio, and statistical data comprises data of a player participating in the real-world activity.

18. The computer system of claim 16, wherein the video, audio, and statistical data comprises data of an environmental factor associated with the real-world activity.

19. The computer system of claim 16, wherein program instructions to apply the real-world scenario to the game application further comprises program instructions to adjust a set of player capability data of the game application, the set of player capability data simulating, within the game application, a capability of a player participating in the real-world activity.

20. The computer system of claim 16, wherein program instructions to apply the real-world scenario to the game application further comprises program instructions to adjust an output of a user interface of the game application, the adjusted output intended to alter an experience of a gamer using the game application.

* * * * *